UNITED STATES PATENT OFFICE.

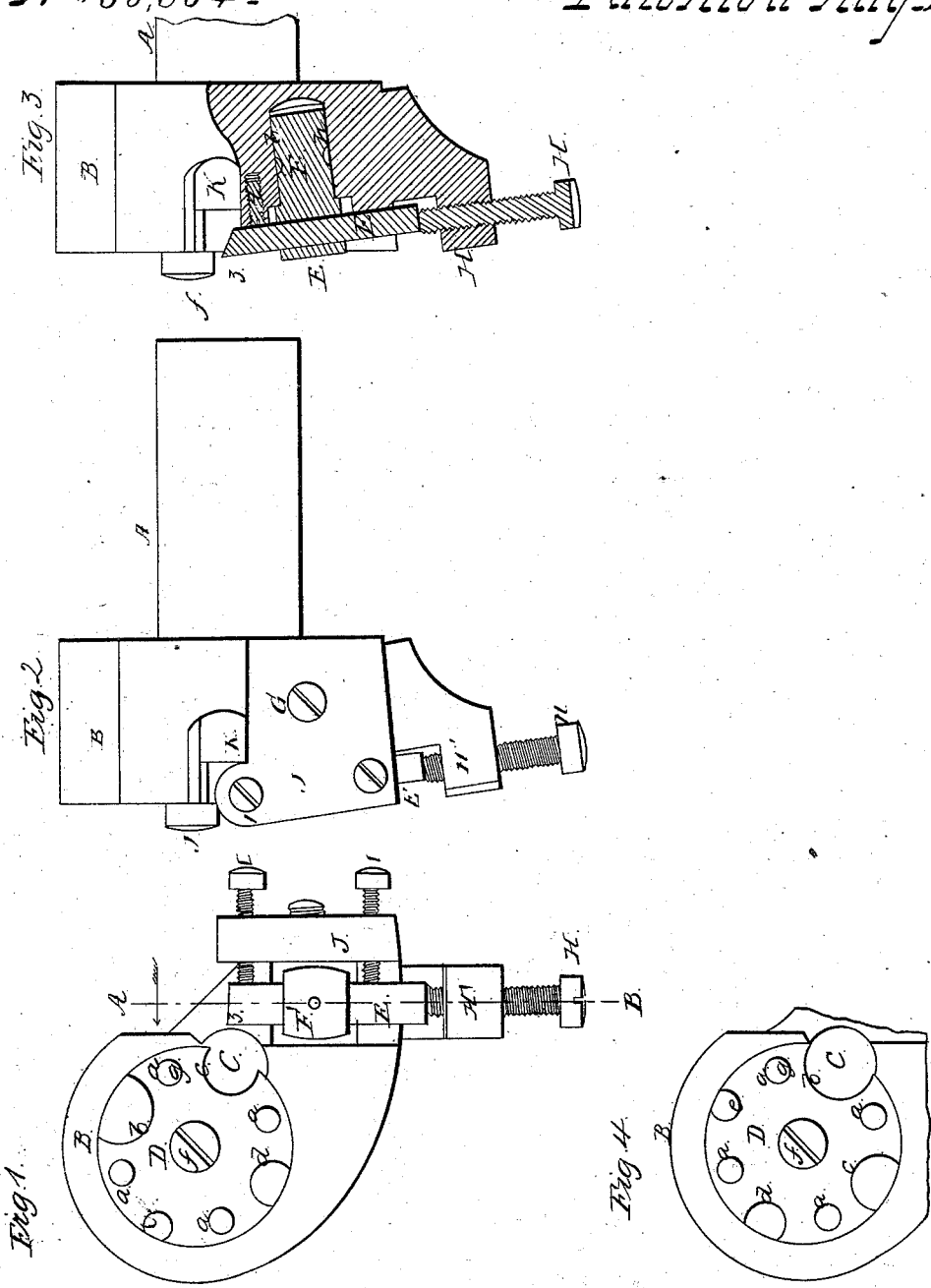

A. W. GIFFORD, OF WORCESTER, MASSACHUSETTS, ASSIGNOR TO E. A. BAGLEY AND MOSES BAGLEY, OF THE SAME PLACE.

IMPROVEMENT IN MILLING-TOOLS.

Specification forming part of Letters Patent No. 68,064, dated August 27, 1867.

*To all whom it may concern:*

Be it known that I, A. W. GIFFORD, of the city and county of Worcester, and Commonwealth of Massachusetts, have invented certain new and useful Improvements in Milling-Tools, of which the following is a full, clear, and exact description, reference being had to the accompanying drawings, forming a part of this specification, in which—

Figure 1 represents a front view of my improved milling-tool. Fig. 2 represents a side view of the same. Fig. 3 represents a section on line A B, Fig. 1, looking in the direction indicated by the arrow; and Fig. 4 represents a front view of a part of the tool shown in Fig. 1, the gage-plate being shown in a different position to that in which it is shown in Fig. 1.

To enable those skilled in the art to which my invention belongs to make and use the same, I will proceed to describe it more in detail.

In the drawings, the part marked A is the hollow shank of the tool, and is to be properly inserted in the arbor or spindle of the tail-stock of a lathe, or be combined with the tail-stock in any other suitable manner. B is the head of the tool, and which I prefer to cast with the shank A. The hole C in the shank A extends through the head B, as fully shown in the drawings. The front of the head B is recessed or cut out to receive the gage-plate D, which is provided with a series of holes, *a*, and circular recesses *b*, *c*, *d*, and *e*, the latter being of different sizes to receive different-sized iron. The gage-plate is held in place by the set-screw *f* and the pin *g*, the latter being fast in the head B. E is the cutter, supported in the head E' of the swivel-arm F, which is fitted in a hole in the head B, the surface of the head E' resting against the cutter, which is placed in the recess cut in the head B, as fully shown in the drawings. A groove, *h*, is cut in the arm F, into which the point of the screw G enters to hold the arm after it has been turned to bring the point 3 of the cutter E into the proper position to act upon the material to be milled. By means of screw H, which passes through a projection, H', the cutter can be adjusted longitudinally, and by the screws I I, which pass through projections J, it can be turned laterally. K is a throat, cut in one side of the head B, through which the chips pass or are delivered by the action of the tool.

The cutter E can be very quickly removed from the slot or hole in the head E' of arm F for grinding, or to be replaced by a new or different one.

The operation is as follows: The milling-tool, having been properly attached to the tail-stock of a lathe, is forced forward upon the end of the iron rod or wire to be milled, the end of which enters the hole C in the head B and shank A, if of sufficient length, and any desired length of screw or bolt may be milled.

It will be seen that the gage-plate D can be moved to give support to four different sizes of screws, and the plate may be made with any desired number of circular openings similar to *b*, *c*, *d*, and *e*. (Shown in the drawings.)

In Fig. 1, plate D is set so that the circular opening *c* in the plate will support the end of the blank screw or bolt, while in Fig. 2 the plate is set so that the circular opening *b* will support the end of the blank screw or bolt.

The gage-plate D is adjusted in a very simple manner, all that is necessary being to turn out screw *f* sufficiently to permit the plate to be moved so as to clear the pin *g*, when the plate can be turned to bring any desired circular opening in the proper position when the plate is moved back into position again, pin *g* entering one of the holes *a* in plate D, which keeps the plate from turning, while screw *f*, being run in again, retains the plate securely in place, as heretofore explained.

The point 3 of the cutter E can be set or adjusted by means of the screw 4, to cut a greater or less chip, as desired. When screw 4 is turned out the cutter will take a greater chip than when it is run in.

It will be observed that the centers of all of the circular recesses or openings are at the same distance from the center of the gage-plate D, so that the end of the blank screw or bolt to be milled, of whatever size it may be, will be properly supported by the gage-plate in a central position during the operation of milling.

By the use of my improved milling-tool the operation of milling blanks for screws and bolts is greatly facilitated, while the tool can be easily and quickly adjusted to mill any desired size of blank in a very accurate manner.

Having described my improved milling-tool, what I claim therein as new and of my invention, and desire to secure by Letters Patent, is—

1. A milling-tool, constructed and operating substantially as set forth.
2. The combination, with the hollow shank A and head B, of the gage-plate D, substantially as and for the purposes described.
3. The combination, with the head B, of the swivel-arm F and cutter E, substantially as and for the purposes set forth.
4. The combination, with the cutter E, of the adjusting-screw 4, arranged substantially as and for the purposes set forth.
5. The combination, with the cutter E and projections H' and J of the head B, of the adjusting-screws H and I I, substantially as and for the purposes set forth.

A. W. GIFFORD.

Witnesses:
  THOS. H. DODGE,
  D. L. MILLER.